United States Patent
Livak et al.

(10) Patent No.: US 9,948,482 B2
(45) Date of Patent: Apr. 17, 2018

(54) APPARATUS AND METHOD FOR ENABLING FLEXIBLE KEY IN A NETWORK SWITCH

(71) Applicant: CAVIUM, INC., San Jose, CA (US)

(72) Inventors: Leonid Livak, San Jose, CA (US); Ravindran Suresh, San Jose, CA (US); Zubin Shah, Santa Clara, CA (US); Sunita Bhaskaran, San Jose, CA (US); Ashwini Reddy, San Jose, CA (US)

(73) Assignee: CAVIUM, INC., San Jose, CA (US)

( * ) Notice: Subject to any disclaimer, the term of this patent is extended or adjusted under 35 U.S.C. 154(b) by 63 days.

(21) Appl. No.: 15/140,394

(22) Filed: Apr. 27, 2016

(65) Prior Publication Data
US 2017/0317922 A1    Nov. 2, 2017

(51) Int. Cl.
| *H04L 12/54* | (2013.01) |
| *H04L 12/947* | (2013.01) |
| *H04L 12/721* | (2013.01) |
| *H04L 12/931* | (2013.01) |
| *H04L 12/743* | (2013.01) |
| *H04L 12/741* | (2013.01) |

(52) U.S. Cl.
CPC ............. *H04L 12/54* (2013.01); *H04L 45/26* (2013.01); *H04L 45/745* (2013.01); *H04L 45/7457* (2013.01); *H04L 49/252* (2013.01); *H04L 49/70* (2013.01)

(58) Field of Classification Search
CPC ............. H04L 49/252; H04L 29/12132; H04L 45/745; H04L 61/1552; H04L 2209/043; H04L 12/54
See application file for complete search history.

(56) References Cited

U.S. PATENT DOCUMENTS

| 8,380,758 | B1* | 2/2013 | Stephens | G06F 9/45512 370/392 |
| 2014/0105215 | A1* | 4/2014 | Mogul | H04L 49/356 370/395.32 |
| 2014/0226661 | A1* | 8/2014 | Mekkattuparamban | H04L 49/70 370/392 |
| 2014/0229630 | A1* | 8/2014 | Narayanan | H04L 45/38 709/238 |
| 2015/0172189 | A1* | 6/2015 | Pitchai, Sr. | H04L 45/745 370/392 |
| 2016/0094420 | A1* | 3/2016 | Clemm | H04L 43/04 709/224 |

* cited by examiner

*Primary Examiner* — Ashley Shivers
(74) *Attorney, Agent, or Firm* — Duane Morris LLP; David T. Xue

(57) ABSTRACT

A network switch to support flexible lookup key generation comprises a control CPU configured to run a network switch control stack. The network switch control stacks is configured to manage and control operations of a switching logic circuitry, provide a flexible key having a plurality of possible fields that constitute part of a lookup key to a table, and enable a user to dynamically select at deployment or runtime a subset of the fields in the flexible key to form the lookup key and thus define a lookup key format for the table. The switching logic circuitry provisioned and controlled by the network switch control stack is configured to maintain said table to be searched via the lookup key in a memory cluster and process a received data packet based on search result of the table using the lookup key generated from the dynamically selected fields in the flexible key.

23 Claims, 3 Drawing Sheets

| Field | width | Description |
|---|---|---|
| Request (input) | | |
| command_enable | 4 | |
| profile_ID | 3 | |
| request_ID | 6 | |
| lookup_key | 384 | |
| Result lane (output, 4 lanes per search logic unit) | | |
| request_ID | 6 | |
| hit | 1 | |
| sorry | 1 | |
| hit_addr | 20 | |
| data | 64 | |

| Field | width | Description |
|---|---|---|
| table_ID | 8 | Table ID infers table type |
| use_tcam_pool | 1 | A wild-card match table may use both SRAM and TCAM pools |
| use_sram_pool | 1 | |
| use_left_group | 1 | A table may use memory from more than one group |
| use_right_group | 1 | |
| sram_pool_start | 3 | Each table may span across multiple SRAM pools |
| sram_pool_end | 3 | |
| tcam_pool_start | 1 | Each table may span across multiple TCAM pools |
| tcam_pool_end | 1 | |
| key_map | 48 | Form table search key with 8-bit granularity |
| age_mark_en | 1 | |
| regrettable | 1 | |
| key_size | 6 | In unit of byte |
| ECMP_en | 1 | |
| ECMP_hash_start | 6 | ECMP hash occupies 10 consecutive bits of the master key |
| rslt_lane_start | 4 | 64-bit data each lane, eight logic lanes for data return |
| rslt_lane_inc | 3 | |

FIG. 3

APPARATUS AND METHOD FOR ENABLING FLEXIBLE KEY IN A NETWORK SWITCH

TECHNICAL FIELD

The present application relates to communications in network environments. More particularly, the present invention relates to flexible lookup keys for table searches in a high speed network processing unit.

BACKGROUND

Network switches/switching units are at the core of any communication network. A network switch typically has one or more input ports and one or more output ports, wherein data/communication packets are received at the input ports, processed by the network switch through multiple packet processing stages, and routed by the network switch to other network devices from the output ports according to control logic of the network switch.

Table lookup/search has been widely adopted for policy-based routing/forwarding of packets by the network switch, wherein the network switch performs lookup/search operations on the routing tables stored in the memory of the network switch for each incoming packet via a search key and takes actions as instructed by the table search results or takes a default action in case of a table search miss. Examples of the policy-based routing performed by the network switch include but are not limited to, Access Control List (ACL) and OpenFlow protocol (wherein the OpenFlow protocol allows a remote controller access to the packet forwarding plane of the network switch over the network). The table search in the network switch allows management of network services by decoupling policies/decisions about where traffic/packets are sent (i.e., the control plane of the network switch) from the underlying systems that forwards the packets to the selected destination (i.e., the data plane of the network switch), which is especially important for Software Defined Networks (SDN).

Each table in the network switch typically includes a set of predefined fields, which includes keys that reflect routing/security policies defined and/or configured by administrator/user of a system in which the network switch is deployed. For example, a system administrator may use the predefined fields to form the lookup/security keys to enforce its security policies. Currently, the network switch is typically delivered to the users/customers having a fixed set of static fields for the users to form their keys under the assumption that most of the customers may adopt similar security policies. In reality, however, the security policies may need to change at runtime and it is desirable for the user to be able to define and configure different lookup keys for different security policies of the network switch at deployment and/or runtime.

The foregoing examples of the related art and limitations related therewith are intended to be illustrative and not exclusive. Other limitations of the related art will become apparent upon a reading of the specification and a study of the drawings.

SUMMARY

A network switch to support flexible lookup key generation comprises a control CPU configured to run a network switch control stack. The network switch control stacks is configured to manage and control operations of a switching logic circuitry, provide a flexible key having a plurality of possible fields that constitute part of a lookup key to a table, and enable a user to dynamically select at deployment or runtime a subset of the fields in the flexible key to form the lookup key and thus define a lookup key format for the table. The switching logic circuitry provisioned and controlled by the network switch control stack is configured to maintain said table to be searched via the lookup key in a memory cluster and process a received data packet based on search result of the table using the lookup key generated from the dynamically selected fields in the flexible key.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

FIG. 2 illustrates examples of formats used for communications between components of the network switch in accordance with some embodiments.

FIG. 3 depicts an example of a search profile maintained and used by the search logic unit in accordance with some embodiments.

DETAILED DESCRIPTION

Figure 1:
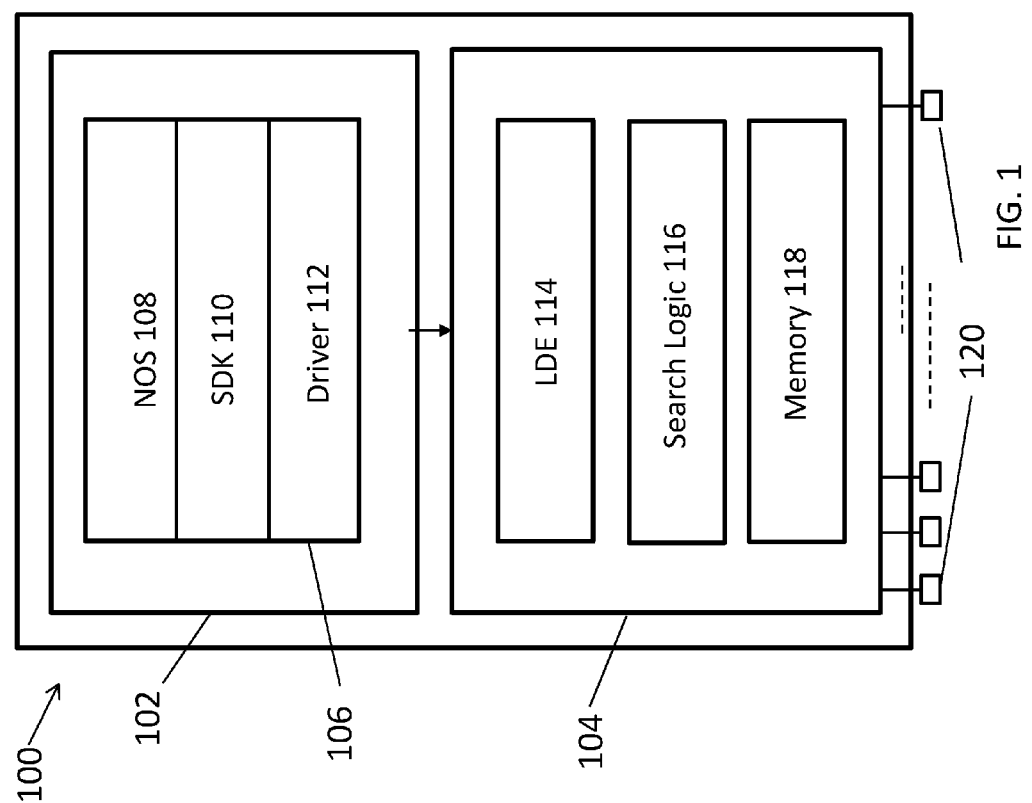
FIG. 1 illustrates an example of a diagram of a network switch/router configured to support flexible lookup key generation in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 illustrates an example of a diagram of a network switch/router 100 configured to support flexible lookup key generation. Although the diagrams depict components as functionally separate, such depiction is merely for illustrative purposes. It will be apparent that the components portrayed in this figure can be arbitrarily combined or divided into separate software, firmware and/or hardware components.

In the example of FIG. 1, the network switch 100 includes a control CPU or microprocessor 102 and a switching logic circuitry 104. Here, the control CPU 102 is configured to execute one or more set of software instructions for practicing one or more processes. Specifically, the control CPU is configured to run one or more of network switch control stacks 106, which are software components. When the network switch 100 is first powered up, the network switch control stacks 106 are loaded from a storage unit (not shown) of the network switch 100 and executed/launched on the control CPU 102, wherein each network switch control stack 106 is configured to manage and control operations of the switching logic circuitry 104 of the network switch 100 as discussed in details below.

In some embodiments, each of the network switch control stacks 106 includes a network operating system (NOS) 108, a switch software deployment kit (SDK) 110, and a switch configuration interface driver 112 for the switching logic circuitry 104. Here, the NOS 108 is a comprehensive software configured to implement a network communication protocol for data communication with one of the clients of the network switch 100 via the switching logic circuitry 104. In addition to other software modules required to manage the network switch 100, the NOS 108 may further include one or more of protocol stacks, including not limited to one of, Open Shortest Path First (OSPF) protocol, which is a routing protocol for Internet Protocol (IP) networks, Border Gateway Protocol (BGP), which is a standardized exterior gateway protocol designed to exchange routing and reachability information among autonomous systems (AS) on the Internet, and Virtual Extensible LAN (Vxlan) Protocol, which is a network virtualization technology that attempts to improve the scalability problems associated with large cloud computing deployments. In some embodiments, different network switch control stacks 106 running on the same control CPU 102 of the network switch 100 may have different types of NOS 108s that are completely unrelated to each other.

In some embodiments, the switch SDK 110 of the network switch control stack 106 is configured to control routing configurations of the switching logic circuitry 104 and the switch configuration interface driver 112 is configured to control and configure a configurable communication bus (e.g., PCIe/I²C/MDIO, etc.) between the network switch control stack 106 and the switching logic circuitry 104. In some embodiments, setting and configurations of the switch SDK 110 of the network switch control stack 106 are adjustable by a user (e.g., network system administrator) via, for example, an Application Programming Interface (API) call, provided by the switch SDK 110.

Importantly, the switch SDK 110 of the network switch control stack 106 is configured to enable a flexible key, which provides a user/system administrator with the capability to dynamically define and select keys to lookup a table maintained in the switching logic circuitry 104 for data packet processing at deployment or runtime. Specifically, the switch SDK 110 is configured to provide the user with the flexible key, which includes a plurality of all possible fields that can constitute the lookup key to the table in the form of, for a non-limiting example, as an enumerated set such as enum. Here, the flexible key provides a superset of fields that the user may choose to create the lookup key at deployment or runtime. The user may then retrieve the plurality of possible fields of the superset key via, for example, an Application Programming Interface (API) call provided by the switch SDK 110, and select a subset of fields from the retrieved flexible key to be a format/configuration of the actual lookup key at deployment or runtime. Once the format of the actual lookup key is selected by the user, the switch SDK 110 is configured to program entries in the table maintained in the switching logic circuitry 104 to form the actual search key to the table based on the newly selected format as discussed below.

By introducing the flexible key, the switch SDK 110 of the network switch control stack 106 provides the user with great flexibility to define and change the lookup keys for searching the tables dynamically without rebooting the network switch 100 for scenarios that would require such change to the lookup keys. As such, the user may dynamically update the routing/security policies of the network switch 100 at deployment or runtime. Additionally, since the switch SDK 110 supports all possible fields that can be used to lookup the table, the size of the lookup key composed of a subset of the fields in the flexible key is configurable, which reduces the scale/size of the tables and improves utilization of the memory maintaining the tables in the switching logic circuitry 104 as discussed below. For example, the user may not select all of the fields to be part of the lookup key to the table at deployment time, which leads to reduced key size and better scalability (smaller size) of the tables.

For a non-limiting example, Access Control List (ACL) of the network switch 100 may utilize the flexible key provided by the switch SDK 110 for ACL key selection and manipulation. Since the ACL key size comprises all possible Layer 2 (L2) and Layer 3 (L3) fields, the size of the ACL key is large, which by default can be as long as 42 bytes. However, with the flexible key provided by the switch SDK 110, the user may not intend to have all of the fields only to be part of the actual lookup and may choose to select only a subset of the fields in the provided flexible key to form the lookup key that fits its specific needs/application, thus greatly reducing the size of the key. As shown by the non-limiting example below, the flexible key may be provided to the user in an enumerated list type, e.g., enum, which includes a plurality of field for the user to select and form the lookup key:

```
typedef enum
{
    XP_IACL_KEY_TYPE_V4,
    XP_IACL_ID,
    XP_IACL_ID1,
    XP_IACL_ID2,
    XP_IACL_MAC_DA,
    XP_IACL_MAC_SA,
    XP_IACL_V4_ETHER_TYPE,
    XP_IACL_CTAG_VID_DEI_PCP,
    XP_IACL_STAG_VID_DEI_PCP,
    XP_IACL_DIP_V4,
    XP_IACL_SIP_V4,
    XP_IACL_L4_DEST_PORT,
    XP_IACL_L4_SRC_PORT,
    XP_IACL_IVIF,
    XP_IACL_ICMP_MSG_TYPE,
    XP_IACL_PROTOCOL,
    XP_IACL_DSCP_HAS_CTAG_STAG,
    XP_IACL_BD,
    XP_IACL_IPV4_DF_MF_SET,
    XP_IACL_IPV4_MAX_FLDS,
}xpIaclV4KeyFlds;
```

In some embodiments, the switch SDK 110 enables the user to select the fields and define the lookup key by calling an API (e.g., Key API) to fill in a field list (e.g., xpIaclkeyFieldList) in the following structure. Once the field list is filled, the lookup key is generated based on the new set of fields and used by the switch SDK 110 to conduct lookup and search on the tables maintained in the switching logic circuitry 104.

```
typedef struct xpIaclkeyField
{
    union{
        xpIaclV4KeyFlds v4Fld;
    }fld;
}xpIaclkeyField_t;
typedef struct xpIaclkeyFieldList
{
    uint32_t numFlds;
    uint32_t isValid;
    xpIaclKeyType type;
    xpIaclkeyField_t *fldList;
```

```
}xpIaclkeyFieldList_t;
xpsIaclDefinePaclKey(xpDevice_t devId,
xpsIaclKeyType_e keyType, xpIaclkeyFieldList_t *fldData)
```

For another non-limiting example, OpenFlow protocol implemented on the network switch 100, which allows a remote controller access to the packet forwarding plane of the network switch over the network, may also utilize the flexible key provided by the switch SDK 110 to define the key fields for implementing the OpenFlow protocol. Implementing the Openflow protocol typically includes defining a number of flow tables each having a different key specific to the flow table. Using the flexible key provided by the switch SDK 110, the user is enabled to define the keys of each of these tables via a single interface (API). Following is a non-limiting example of a list of key fields enumerated via, e.g., enum, which supports Openflow implementation:

```
typedef enum
{
    XP_OPENFLOW_V4_KEY_INGRESS_VIF,
    XP_OPENFLOW_V4_KEY_META_DATA,
    XP_OPENFLOW_V4_KEY_DESTINATION_MAC,
    XP_OPENFLOW_V4_KEY_SOURCE_MAC,
    XP_OPENFLOW_V4_KEY_ETHER_TYPE,
    XP_OPENFLOW_V4_KEY_IP_PROTO,
    XP_OPENFLOW_V4_KEY_DIP,
    XP_OPENFLOW_V4_KEY_SIP,
    XP_OPENFLOW_V4_KEY_L4_DEST_PORT,
    XP_OPENFLOW_V4_KEY_L4_SOURCE_PORT,
    XP_OPENFLOW_V4_KEY_VLAN_ID,
    XP_OPENFLOW_V4_FIELD_NUM
}xpOpenFlowV4KeyFlds;
```

The user may then set the format/formation of key for a particular flow table on a particular network switch 100 with the following API provided by the switch SDK 110:

XP_STATUS xpsOfSetTableKeyFormat(xpsDevice_t devId, uint32_t tableId, xpOfTableType_e tableType, const xpOpenFlowKeyFieldList_t*fieldList)

In the example of FIG. 1, the switching logic circuitry 104 of the network switch 100 is an application specific integrated circuit (ASIC), which is provisioned and controlled by the network switch control stack 106 and is dedicated to serve and route data packets for a specific client/web service host. In some embodiments, part of the switching logic circuitry 104 is controlled by one network switch control stack 106 while another part of the switching logic circuitry 104 is controlled by another network switch control stack 106. As shown by the example of FIG. 1, the switching logic circuitry 104 further comprises one or more lookup and decision engines (LDEs) 114, a search logic unit 116, and a local memory cluster 118.

In the example of FIG. 1, each LDE 114 of the switching logic circuitry 104 is configured to generate a lookup key based on the list of fields of the flexible key selected by the user via the switch SDK 110 as discussed above. Each LDE 114 is also configured to determine processing conditions and/or rules based on search results of the tables by the search logic unit 116 using the lookup key and to process/modify a packet received accordingly. Here, the conditions and/or rules packet processing are fully programmable by software and are based on network features and protocols configured for the LDE 114.

In the example of FIG. 1, the switching logic circuitry 104 further includes its own corresponding local memory cluster 118 for maintaining the tables to be searched by the lookup key generated from the flexible key through its corresponding search logic unit 116 as discussed below. In some embodiments, the memory cluster 118 includes a variety of memory tiles (not shown) that can be but are not limited to a plurality of static random-access memory (SRAM) pools and/or ternary content-addressable memory (TCAM) pools. Here, each SRAM pool support direct memory access and each TCAM pool encodes three possible states instead of two with a "Don't Care" or "X" state for one or more bits in a stored data word for additional flexibility. In some embodiments, the memory cluster 118 is flexibly configured to accommodate and store different table types as well as sizes (entry widths). Since certain memory operations such as of hash table and Longest-Prefix Matching (LPM) table lookup may require access to multiple memory pools for best memory efficiency, the division of each memory cluster 108 into multiple separate pools allows for parallel memory accesses.

In the example of FIG. 1, the search logic unit 116 of the switching logic circuitry 104 is configured to accept and process a unified table request to search tables stored in the memory cluster 118, wherein the unified table request includes the lookup key generated from the flexible key provided by the switch SDK 110. The search logic unit 116 identifies the memory cluster 118 that maintain the tables to be searched, constructs a plurality of search keys specific to the memory cluster 118 based on the lookup key and transmit a plurality of table search requests/commands to the memory clusters 118, wherein the search request/command to the memory cluster 118 includes identification/type of the tables to be searched and the search key specific to the memory cluster 118. In some embodiments, the search logic unit 116 is configured to generate the search keys having different sizes to perform different types of table searches/lookups specific to the memory cluster 118 based on the lookup key generated from the flexible key. In some embodiments, the sizes of the search keys specific to the memory clusters 108 are much shorter than the lookup key to save bandwidth consumed between the search logic unit 116 and the memory cluster 118. Once the table search across the memory cluster 118 is done, the search logic unit 116 is configured to collect the search results from the memory cluster 118 and provide the search results to the LDE 114 in a unified response format.

FIG. 2 illustrates examples of formats used for communications between components of the network switch 100. As depicted by the example in FIG. 2, the unified table request 202 includes the lookup key generated from the flexible key, which can be but is not limited to 384 bits in width. The unified table request 202 further includes a search profile ID, which identifies a search profile describing how the table search/lookup should be done. Based on the search profile, the search logic unit 116 can then determine the type of table searched/lookup, the memory cluster 118 to be searched, and how the search keys specific to the memory cluster 118 should be formed. Since there are three bits for the profile ID in this example, there can be up to eight different search profiles. The unified table request 202 further includes a request_ID and a command_ID, representing the type of the request and the search command to be used, respectively.

In some embodiments, the search logic unit 116 is configured to transmit the lookup result back to the LDE 114 in the unified response format as a plurality of (e.g., four) result lanes as depicted in the example of FIG. 2, wherein each result lane represents a portion of the search results. As depicted in FIG. 2, each result lane 204 has a data section representing a portion of the search result (e.g., 64 bits wide), the same request_ID as in unified table request 202, a hit indicator and a hit address where a matching table entry is found. As such, the search logic unit 116 may take multiple cycles to return the complete search results.

FIG. 3 depicts an example of a search profile 300 maintained and used by the search logic unit 116, to generate the plurality of table search requests in parallel to the memory clusters 118. As shown in the example in FIG. 3, the search profile 300 include information on the types of memory clusters/pools to be searched, the identification of the memory clusters/pools to be searched, the types of table search/lookup to be performed, how the search keys should be generated from the lookup key that are specific to the memory pools, and how the search results should be provided back to the requesting LDE 114 for packet processing. Here, the search profile 300 indicates whether the search will be performed to the memory cluster 118 local to the search logic unit 116 and/or to one or more neighboring memory clusters 118s in parallel as well. The search range within each of the memory clusters 118s is also included in the search profile 300.

In the example of FIG. 1, the network switch 100 further includes a plurality of I/O ports 120 controlled by the network switch control stack 106 for routing and forwarding data packets processed by the network switch 100 based on the search result of the table using the lookup keys generated from the flexible key provided by the switch SDK 110. Here, each I/O port 120 supports data transmission at various speeds, e.g., 1/10/25/100 Gbps.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A network switch to support flexible lookup key generation, comprising:
   a control CPU configured to run a network switch control stack, wherein the network switch control stacks is configured to
      manage and control operations of a switching logic circuitry of the network switch;
      provide, independent of receiving a data packet, a flexible key having a plurality of possible fields that constitute part of a lookup key to a table maintained in the switching logic circuitry;
      enable a user to dynamically select at deployment or runtime a subset of the plurality of fields in the flexible key to form the lookup key and thus define a lookup key format for the table;
   said switching logic circuitry provisioned and controlled by the network switch control stack and configured to
      maintain said table to be searched via the lookup key in a memory cluster of the switching logic circuitry;
      process a received data packet based on search result of the table using the lookup keys generated from the dynamically selected fields in the flexible key.

2. The network switch of claim 1 wherein:
   the switching logic circuitry is an application specific integrated circuit (ASIC).

3. The network switch of claim 1 further comprising:
   a plurality of I/O ports controlled by the network switch control stack for routing and forwarding data packets processed by the network switch based on the search result of the table using the lookup keys generated from the flexible key.

4. The network switch of claim 1, wherein:
   the network switch control stack comprises
      a network operating system (NOS) configured to implement a network communication protocol for data communication with the network switch;
      a switch software deployment kit (SDK) configured to provide the flexible key and control routing configuration of the switching logic circuitry; and
      a switch configuration interface driver configured to control and configure a configurable communication bus between the network switch control stack and the switching logic circuitry.

5. The network switch of claim 4, wherein:
   the NOS includes one or more of Open Shortest Path First (OSPF) protocol, Border Gateway Protocol (BGP), and Virtual Extensible LAN (Vxlan) Protocol.

6. The network switch of claim 4, wherein:
   the switch SDK is configured to provide an Application Programming Interface (API) for the user to retrieve the plurality of possible fields of the flexible key and to select the subset of the fields from the retrieved flexible key to be a format/configuration of the lookup key at deployment or runtime.

7. The network switch of claim 4, wherein:
   the switch SDK is configured to enable the user to dynamically define and change the lookup key without rebooting of the network switch when the lookup key needs to be changed.

8. The network switch of claim 4, wherein:
   the switch SDK is configured to provide the plurality of fields of the flexible key in the form of an enumerated list.

9. The network switch of claim 1, wherein:
   size of the lookup key composed of the subset of the fields of the flexible key is configurable.

10. The network switch of claim 9, wherein:
    the user is enabled to dynamically select less than all of the plurality of fields in the flexible key to form the lookup key to the table, which leads to reduced size of the lookup key and smaller size of the table.

11. The network switch of claim 1, wherein:
    the flexible key is utilized by Access Control List (ACL) of the network switch for ACL key selection and manipulation.

12. The network switch of claim 1, wherein:
    the flexible key is utilized to implement OpenFlow protocol on the network switch by defining a number of flow tables of OpenFlow protocol, each having a different key specific to the flow table.

13. The network switch of claim 1, wherein:
    the memory cluster includes a plurality of static random-access memory (SRAM) pools and/or ternary content-addressable memory (TCAM) pools.

14. The network switch of claim 1, wherein:
the switching logic circuitry is configured to
    accept and process a unified table request to search the table stored in the memory cluster, wherein the unified table request includes the lookup key generated from the flexible key;
    collect and transmit the search result in a unified response format as a plurality of result lanes, wherein each result lane represents a portion of the search result.

15. A method to support flexible lookup key generation, comprising:
managing and controlling operations of a switching logic circuitry of a network switch via a network switch control stack running on a control CPU;
providing, independent of receiving a data packet, a flexible key having a plurality of possible fields that constitute part of a lookup key to a table maintained in the switching logic circuitry;
enabling a user to dynamically select at deployment or runtime a subset of the plurality of fields in the flexible key to form the lookup key and thus define a lookup key format for to the table;
maintaining said table to be searched via the lookup key in a memory cluster of a switching logic circuitry provisioned and controlled by the network switch control stack;
processing a received data packet based on search result of the table using the lookup keys generated from the dynamically selected fields in the flexible key.

16. The method of claim 15, further comprising:
implementing a network communication protocol for data communication with the network switch via a network operating system (NOS) in each of the network switch control stacks;
providing the flexible key and control routing configuration of the switching logic circuitry via a switch software deployment kit (SDK) in the network switch control stack; and
controlling and configuring a configurable communication bus between the network switch control stack and the switching logic circuitry via a switch configuration interface driver in the network switch control stack.

17. The method of claim 16, further comprising:
providing an Application Programming Interface (API) for the user to retrieve the plurality of possible fields of the flexible key and to select the subset of the fields from the retrieved flexible key to be a format/configuration of the lookup key at deployment or runtime.

18. The method of claim 16, further comprising:
enabling the user to dynamically define and change the lookup key without rebooting of the network switch when the lookup key needs to be changed.

19. The method of claim 16, further comprising:
providing the plurality of fields of the flexible key in the form of an enumerated list.

20. The method of claim 15, further comprising:
enabling the user to dynamically select less than all of the plurality of fields in the flexible key to form the lookup key to the table, which leads to reduced size of the lookup key and smaller size of the table.

21. The method of claim 15, further comprising:
utilizing the flexible key by Access Control List (ACL) of the network switch for ACL key selection and manipulation.

22. The method of claim 15, further comprising:
utilizing the flexible key to implement OpenFlow protocol on the network switch by defining a number of flow tables of OpenFlow protocol, each having a different key specific to the flow table.

23. The method of claim 15, further comprising:
accepting and processing a unified table request to search the table stored in the memory cluster, wherein the unified table request includes the lookup key generated from the flexible key;
collecting and transmitting the search result in a unified response format as a plurality of result lanes, wherein each result lane represents a portion of the search result.

* * * * *

UNITED STATES PATENT AND TRADEMARK OFFICE
CERTIFICATE OF CORRECTION

PATENT NO. : 9,948,482 B2
APPLICATION NO. : 15/140394
DATED : April 17, 2018
INVENTOR(S) : Leonid Livak et al.

Page 1 of 1

It is certified that error appears in the above-identified patent and that said Letters Patent is hereby corrected as shown below:

In the Claims

Column 7, Claim 1, Line 54, delete "stacks" and insert -- stack --, therefor.

Column 9, Claim 15, Line 24, delete "to".

Signed and Sealed this
Third Day of July, 2018

Andrei Iancu
*Director of the United States Patent and Trademark Office*